April 11, 1961  H. R. SHAW  2,979,717
VOLTAGE COMPARISON CIRCUIT
Filed Aug. 20, 1953  2 Sheets-Sheet 1
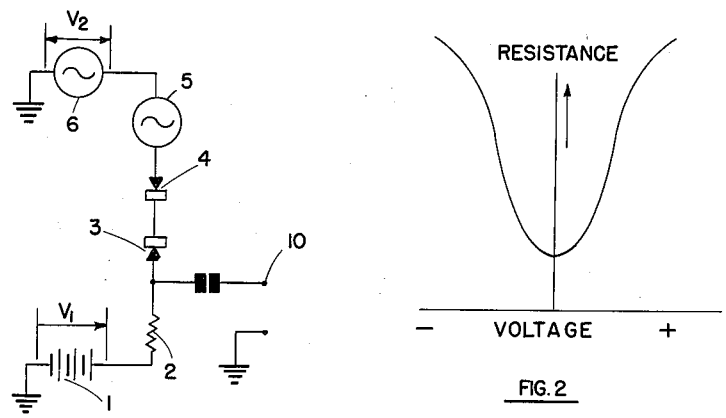
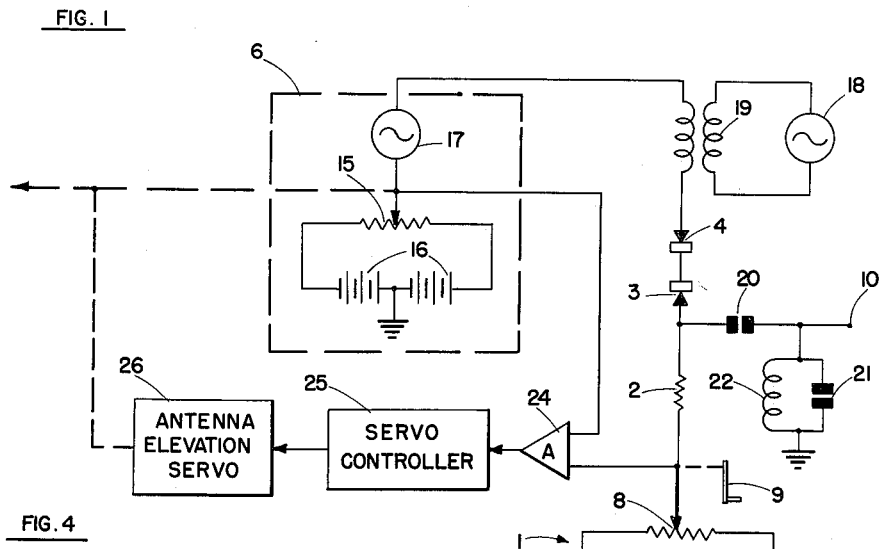
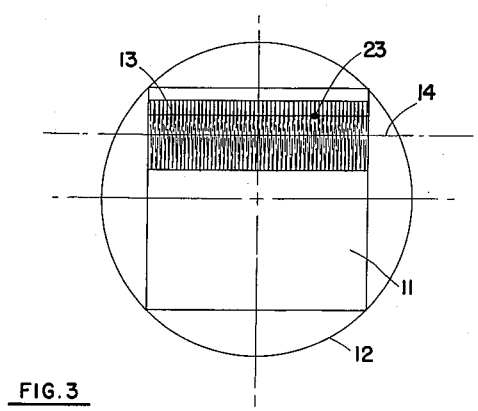
INVENTOR.
HUBERT R. SHAW
BY
William R. Lane
ATTORNEY April 11, 1961  H. R. SHAW  2,979,717
VOLTAGE COMPARISON CIRCUIT
Filed Aug. 20, 1953  2 Sheets-Sheet 2

*INVENTOR.*
HUBERT R. SHAW
BY
William R. Lane
ATTORNEY

United States Patent Office 2,979,717
Patented Apr. 11, 1961

2,979,717
VOLTAGE COMPARISON CIRCUIT

Hubert R. Shaw, Downey, Calif., assignor to North American Aviation, Inc.

Filed Aug. 20, 1953, Ser. No. 375,525

15 Claims. (Cl. 343—117)

This invention is an electronic circuit which compares two input voltages and indicates when they are equal in polarity and magnitude. Particular utility of this device is found in providing an electronic cursor on a radar indicator, in connection with means for positioning the radar antenna so as to point at a selected target.

In many electronic circuits, it is desirable to continuously compare amplitudes and polarities of two separate voltages. Each of these voltages may be a signal, or one may be a reference with which the other is compared. The output of this device is a burst of several cycles of carrier frequency, at the instant at which the voltages are equal in polarity and substantially equal in magnitude.

It is not desirable to connect two voltage sources directly together to compare them because of the fact that they may exert a considerable influence upon each other. Various potential comparators in the past have used considerable circuitry in an effort to obtain an output which does not drift, that is, whose peak amplitude output occurs and remains at a point of zero difference in potential between the two compared voltages.

In some instances, in order to provide a high impedance comparison circuit, the two voltages have been fed to the grid of respective triodes and the plate outputs of the tubes compared. Such a method is subject to difficulty because of the necessity of maintaining equal amplification in both tubes. Still other comparison circuits become inaccurate upon change in frequency of either compared voltage. Further, most voltage comparators are unable to compare signals at times when they are both negative as well as both positive.

An object of this invention is to provide a simplified and reliable electronic circuit which will indicate when two compared voltages are equal.

It is another object of this invention to provide a voltage comparison circuit capable of generating a cursor on a radar indicator.

It is a further object of this invention to provide a voltage comparison circuit which is relatively independent of frequency of either of the compared voltages.

It is a further object of this device to provide a voltage comparison circuit which is stable and relatively free from drift.

It is still a further object of this invention to provide a voltage comparison circuit which utilizes a minimum of electronic elements.

Further objects of this invention will become apparent from the following description taken in connection with the accompanying drawings, in which Fig. 1 is the device of the invention in simplified form;

Fig. 2 is a graph showing the effective resistance through diodes connected as shown in Fig. 1;

Fig. 3 is a drawing of an indicator having a cursor established electronically by the device of Fig. 1;

Fig. 4 is the device of the invention adapted for use in a radar system;

Figure 8:
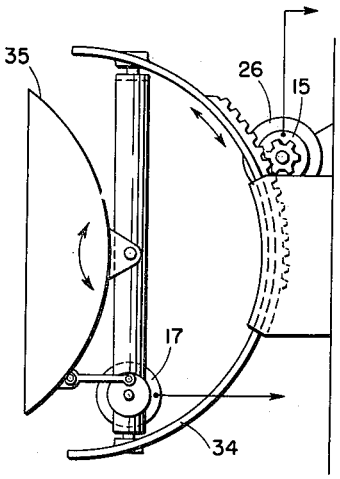

And Fig. 8 is an illustration of the radar antenna mount.

The device herein described provides an indication whenever one voltage is instantaneously of the same polarity and equal to another. The indication is in the form of a burst of the carrier signal which has maximum amplitude when the differential voltage is zero. When the difference between compared voltages is as large as a few hundredths of a volt, the output falls to a relatively small value. The indication is substantially independent of the polarity or frequency of the differential voltage.

Referring to Fig. 1, voltage source 1 is connected to load resistance 2. Diodes or rectifiers 3 and 4 are connected back-to-back, as indicated. Diode 4 is, in turn, connected to carrier signal source 5 which is connected to voltage source 6. The frequency of carrier signal source 5 is high compared to any variation of the voltages of sources 1 or 6 and is also relatively small in amplitude compared to the usual values of the voltages from sources 1 and 6. The function of this circuit is to provide a signal output at the upper terminal of resistor 2, in response to an essentially zero differential voltage between sources 1 and 6.

The characteristic output of diodes connected as shown in Fig. 1 is indicated in Fig. 2, which shows that the effective resistance is dependent upon the magnitude of voltage across the rectifiers. Both diodes may be reversed in direction from that shown. It is only necessary that they be oppositely directed from each other. Their combined resistance is comparatively low at zero voltage and increases rapidly as the voltage departs from zero value in either direction. Minimum resistance as shown in Fig. 2 may be offset a few hundredths of a volt to the left or right, due to the characteristics of the pair of diodes. Referring again to Fig. 1, the voltage of carrier source 5 is divided across the resistance of diodes 3 and 4 and the resistance 2. If voltage sources 1 and 6 are relatively larger than the amplitude of source 5, as previously stated, they will be the effective control of the resistance of the back-to-back rectifier arrangement. Resistor 2 is of a value considerably larger than the minimum resistance of the combined diodes. As a result, when the voltages of sources 1 and 6 are equal and rectifiers 3 and 4 have a minimum of resistance, substantially the entire amplitude of carrier source 5 is impressed across resistance 2. Considering the source 1 as a fixed reference voltage and the source 6 as an alternating voltage to be compared with reference 1, the output signal amplitude at terminal 10 will decrease rapidly as the voltage of source 6 departs in either direction from the fixed reference voltage of source 1. Therefore, the output of this device is in the form of bursts of the carrier signal which occur at the particular instant when voltage $V_2$ is equal to the reference voltage $V_1$.

The voltage comparison circuit described above is especially adapted for use in the scanning system of a radar. During the search phase, the antenna is subject to rapid oscillation in elevation, and relatively slow oscillation in azimuth. The antenna thus scans in a manner which yields a substantially rectangular picture 11 as seen on the radar indicator 12 in Fig. 3. The indicator of Fig. 3 is a type "C" radar presentation, elevation versus azimuth, and the cursor is established in elevation. In an indicator, it is desirable to know when the radar antenna reaches a certain elevation. This elevation is predetermined by a radar operator and set into the radar scanning system. Subsequently, whenever the antenna reaches that predetermined elevation, the cathode-ray beam is intensified and a small signal appears on the indicator. If the antenna sweeps in azimuth, at the same time, several such small signals produce a line, or cursor. From this cursor, the operator can determine the relative position of antenna sweep and targets appearing on the scope.

Fig. 4 illustrates the circuitry of the invention as used in a radar system to obtain the above cursor. Voltage source 1, in this instance, is indicated as being a variable reference comprising a D.-C. source 7 across which is connected potentiometer 8, whose wiper may be adjusted by hand control 9. The output at the wiper is the voltage $V_1$ of source 1 indicated in Fig. 1. Radar antennas are provided with two sources of motion in elevation. Referring to Fig. 8, antenna elevation servo 26 elevates the antenna scarf ring 34. An additional rapid oscillation in elevation is impressed on the parabolic reflector 35 of the antenna by motor means not shown. The generator 17 is rotated by reflector 35 to provide an electrical output whose amplitude indicates the oscillatory position of the reflector. Therefore, source 6 (indicated within dotted lines, Fig. 4) is the sum of two voltages, a varying D.-C. and an A.-C. The angle to which the antenna is driven in elevation is indicated by potentiometer 15, Figs. 4 and 8, which is connected across D.-C. source 16 whose wiper is physically positioned by the elevation of the antenna. Inasmuch as the reflector is driven to oscillate in elevation, generator 17, whose shaft is rotated according to this oscillation, provides an electrical output which is added to the output of potentiometer 15. These are added together to provide the information voltage as to the antenna sweep in elevation. The carrier signal source takes the form of an oscillator 18 which is coupled into the comparison network by means of transformer 19. Coupling condenser 20 connects the output of the circuit to a tuned circuit which consists of capacitor 21 and inductance 22. This circuit is tuned to the frequency of the carrier signal. The output of the tuned circuit is to the radar indicator, a cathode ray tube, and controls the intensity of the beam. The intensity of the beam of the cathode ray is thus greater in instances when the voltage output of source 1 and the voltage output of source 6 are equal. This causes a strong trace at that instant, and as the antenna sweeps in azimuth, a cursor 13 comprised of many successive intensified traces appears on the indicator as indicated in Fig. 3. The electronic cursor is then presented at any desired elevation angle as controlled by the reference voltage set by the pilot at voltage source 1. The cursor may thus be positioned by manual adjustment to extend through a target 23, Fig. 3.

Since the output of voltage source 1 is substantially equal to the output of voltage source 6 when the antenna is at the elevation equal to that of the target, differences between source 1 and 6 may be utilized as an error signal in a servo system to control the antenna elevation, that is, may be utilized to position the antenna at the correct elevation angle indicated by the electronic cursor. In positioning the radar, the small oscillatory motion of the antenna ceases (the output of generator 17 is zero) and the antenna drive voltage is compared with the voltage source 1. If a servo drives the antenna then to zero error signal, the elevation 14, of Fig. 3, of the antenna will be the same as that of the electronic cursor 13. In comparison of the two voltages, a differential amplifier 24, Fig. 4, determines if there is any difference in voltages generated and drives servo controller 25 accordingly, which, in turn, drives the elevation servo 26 of the antenna. The antenna will thus be driven until there is no difference between its position and that of the electronic cursor. This operation occurs during the radar "lock-on" phase, after the search has been completed and the pilot has set the cursor to intersect the chosen target. In order to enable pointing the antenna beam in two dimensions, a similar voltage comparison circuit may be used to produce an azimuth cursor.

Figure 5:
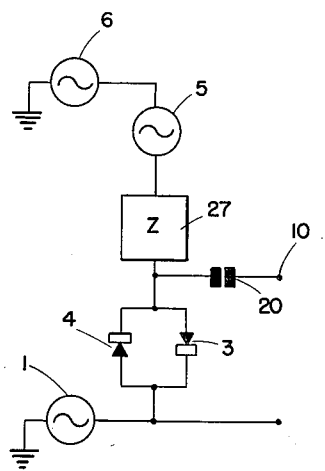
Fig. 5 is an alternate construction of the device of this invention.

An alternate construction is shown in Fig. 5 in which the diodes are shown connected in parallel. Impedance 27, having a relatively large value at carrier signal frequency, is connected in series with carrier signal source 5 which circuit then has a substantially constant (carrier) current characteristic. The output at 10 is in the form of a current source of signal bursts when the difference in voltage between sources 1 and 6 is zero. In parallel, the rectifiers present resistance which becomes maximum at zero voltage, whereas the series rectifiers present a resistance which becomes minimum at zero voltage. This circuit is more sensitive to differences in voltage sources 1 and 6 and gives a sharper indication of when they are equal.

Figure 6:
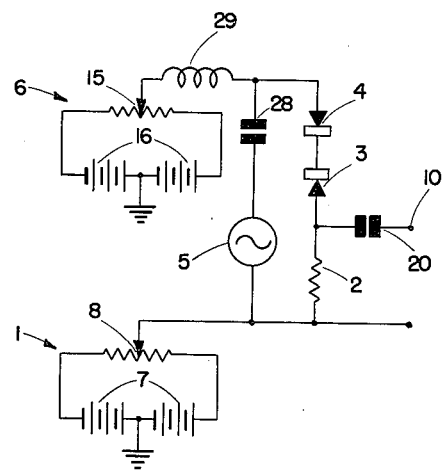
Fig. 6 illustrates another modification of the device.

In Fig. 6, carrier frequency source 5 is connected in parallel with diodes 3 and 4 and resistor 2. In this embodiment, capacitor 28 prevents the lower frequency voltages from being short-circuited through carrier source 5, and inductance 29 prevents the carrier frequency voltage from being short-circuited through the voltage source.

Figure 7:
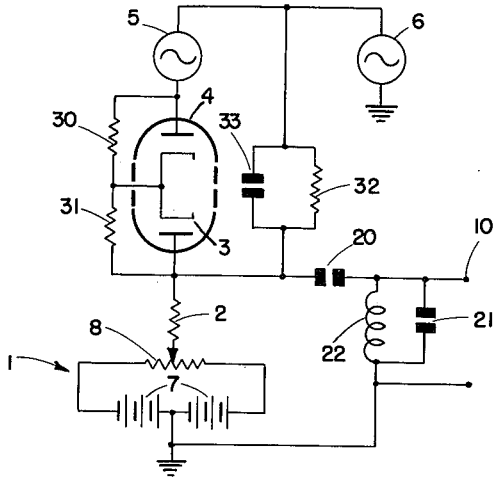
Fig. 7 illustrates the employment of tubes in the circuit.

Fig. 7 shows how tube diodes 3 and 4 may be substituted for semi-conductor diodes. These two diodes have been shunted with resistors 30 and 31 and neutralized by resistor 32 and capacitor 33.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an electronic circuit, in series connection, a reference voltage source, an impedance, a carrier frequency source, a varying voltage source, and a means for energizing said impedance from said carrier frequency source when said reference and varying voltage sources are of equal magnitude comprising a plurality of oppositely directed diodes.

2. In series in a voltage comparison circuit, a first input terminal for receiving a first voltage, a carrier frequency source, a load resistor, a second input terminal for receiving a second voltage, an output terminal connected to said resistance, and a means for energizing said load resistor from said carrier frequency source when said first and second voltages are of equal magnitude comprising a first diode and an oppositely directed second diode.

3. In series in a voltage comparison circuit, a first voltage source, a carrier frequency source, a load resistor, a second voltage source, and a means for energizing said load resistor from said carrier frequency source when said first and second voltages are of equal magnitude comprising a pair of series-connected, oppositely directed diodes.

4. In an electronic circuit for establishing a cursor on a radar indicator in accordance with the motion of the antenna, in series connection, a first voltage source varying in accordance with the motion of an antenna relative to its mounting frame and in circuit therewith, a carrier frequency source, a plurality of oppositely directed diodes, a load impedance, and an adjustable reference voltage source.

5. The combination recited in claim 4 which includes a resonant circuit tuned to the frequency of said carrier source in circuit with said load impedance.

6. In an antenna positioning device, in series connection an adjustable reference voltage source, a load impedance, at least two oppositely directed diodes, a carrier frequency source, and a second voltage source varying in accordance with the motion of an antenna relative to its mounting frame, and means for servo controlling the antenna driven by the difference in amplitude of said reference voltage and said varying voltage whereby said antenna is directed to a position corresponding to the adjustment of said reference voltage source.

7. In an antenna positioning device, in series connection an adjustable reference voltage source, a load impedance, at least two oppositely directed diodes, a carrier frequency source, a second voltage source varying in accordance with the elevation drive of a radar antenna relative to its mount, and a third voltage source varying in accordance with the oscillatory motion of said antenna, whereby the output of said carrier frequency source across said impedance is controlled by the difference between said reference voltage and the sum of said second and third voltages.

8. In combination, at least two serially connected oppositely directed diodes, a reference voltage source, a second voltage source, a load impedance, a carrier frequency source in parallel circuit with said diodes and said impedance, means connecting said reference voltage source in circuit with one side of said oppositely directed diodes, and means connecting said second voltage source in circuit with the other side of said diodes whereby the amplitude of the carrier frequency impressed across said impedance is dependent upon the combined resistance of said diodes which is determined by the difference in voltage between said reference voltage source and said second voltage source.

9. An impedance element comprising a pair of diodes each having first and second oppositely conductive electrodes, means connecting together the first electrodes of said diode pair, means connected solely to said diode pair at their respective second electrodes for applying to said diodes two relatively varying voltages, and a carrier voltage source of higher frequency and lower amplitude than said two voltages connected to said diodes, whereby said diodes conduct said carrier frequency voltage only when said relatively varying voltages are substantially equal.

10. An impedance element comprising two diodes each having cathode and anode electrodes, means connecting one of said electrodes of one diode to a like electrode of the other diode, and first and second means connected solely to said diodes at their respective remaining electrodes for applying a carrier frequency voltage across said diodes and for applying two relatively varying voltages of larger magnitude than said carrier frequency voltage across said diodes whereby the flow of carrier frequency current in said diodes is controlled by the difference between said relatively varying voltages.

11. In an electronic circuit, a plurality of oppositely directed diodes, an impedance in series with said diodes, a carrier frequency source in series circuit with said diodes, means for applying a varying voltage across said diodes and said impedance whereby the effective resistance to said carrier frequency source is controlled.

12. In combination, a plurality of oppositely connected diodes, means for providing a control voltage across said diodes, carrier frequency means of lower amplitude and higher frequency than said control voltage connected in series circuit with said diodes, and means for determining the flow of carrier current through said diodes.

13. An impedance element comprising a pair of diodes each having an anode and a cathode, a connection between the anode of one diode and the anode of the other diode, two relatively varying voltages respectively connected solely to said diode pair at their respective cathodes, and a carrier voltage source coupled to said diodes whereby said diodes conduct said carrier frequency voltage only when the potential difference between said relatively varying voltages is substantialy zero.

14. An impedance element comprising a pair of diodes each having an anode and a cathode, a connection between the cathode of one diode and the cathode of the other diode, two relatively varying voltages connected respectively solely to said diode pair at their respective anodes, and a carrier voltage source coupled to said diodes whereby said diodes conduct said carrier frequency voltage only when the potential difference between said relatively varying voltages is substantially zero.

15. A voltage comparison circuit for ascertaining when a pair of relatively varying voltages are of equal magnitude comprising a pair of series-connected oppositely directed diodes, a carrier frequency source in series circuit with said diodes, means connecting said relatively varying voltages to said diode pair for placing substantially zero voltage across each of said diodes when said relatively varying voltages are of equal magnitude, and an output impedance connected in series circuit with said diode pair and said carrier frequency source.

References Cited in the file of this patent
UNITED STATES PATENTS

| | | |
|---|---|---|
| 1,985,095 | Hoare | Dec. 18, 1934 |
| 2,413,440 | Farrington | May 15, 1942 |
| 2,456,666 | Agate | Dec. 21, 1948 |
| 2,616,960 | Dell et al. | Nov. 4, 1952 |
| 2,727,224 | Adkins | Dec. 13, 1955 |